United States Patent [19]

Chevallier et al.

[11] Patent Number: 4,877,272
[45] Date of Patent: Oct. 31, 1989

[54] METAL STATIC SEAL AND ASSEMBLY COMPRISING SUCH A SEAL

[75] Inventors: Marc Chevallier, Tourny; Guy Froger, Vernon, both of France

[73] Assignee: Societe Anonyme: Societe Europeene De Propulsion, Suresnes, France

[21] Appl. No.: 143,080
[22] PCT Filed: Mar. 31, 1987
[86] PCT No.: PCT/FR87/00100
§ 371 Date: Dec. 1, 1987
§ 102(e) Date: Dec. 1, 1987
[87] PCT Pub. No.: WO87/05978
PCT Pub. Date: Oct. 8, 1987

[30] Foreign Application Priority Data

Apr. 1, 1986 [FR] France .................. 86 04610

[51] Int. Cl.$^4$ .............................................. F16L 17/06
[52] U.S. Cl. ................................. 285/111; 285/212; 285/351; 285/917; 277/236
[58] Field of Search ............... 285/212, 917, 110, 111, 285/351, 211, 220, 351; 277/235, 236

[56] References Cited

U.S. PATENT DOCUMENTS

| | | | |
|---|---|---|---|
| 2,852,281 | 9/1958 | Ellis . | |
| 3,058,750 | 10/1962 | Taylor | 285/917 |
| 3,142,498 | 7/1964 | Press | 285/917 X |
| 3,376,053 | 4/1968 | Novakovich et al. | 285/212 X |
| 3,759,552 | 9/1973 | Levinsohn et al. | 285/917 X |
| 4,597,596 | 7/1986 | Tuzer | 285/917 X |

FOREIGN PATENT DOCUMENTS

| | | | |
|---|---|---|---|
| 595332 | 9/1925 | France | 285/917 |
| 1356218 | 2/1964 | France . | |
| 1537146 | 7/1968 | France . | |
| 1563153 | 3/1969 | France . | |

Primary Examiner—Dave W. Arola
Attorney, Agent, or Firm—Bryan, Cave, McPheeters & McRoberts

[57] ABSTRACT

The static seal comprises a semi-rigid annular part (11) shaped as a bead and first and second wings (12, 13) extending transversely with respect to the seal axis and laterally connected to the bead portion (11) in a gradual manner by means of concave surfaces with a large curvature radius. The seal has in its axial cross-section the shape of a V lying on its side, the tapered surfaces (16, 17) of the branches (12, 13) of the V being slightly inclined with respect to the planar surfaces (18, 19) of the bead (11) to which they are attached. The branches (12, 13) of the V forming the wings have an elasticity such that by flexure of said tapered surfaces (16, 17) of the V branches and slight flexure of the bead (11), the extremities of said surface may form with the planar surfaces (18, 19) of the bead (11) to which they are attached two sealing regions. Said seal is intended to be used in severe conditions of temperature, pressure, vibrations and chemical attack.

10 Claims, 3 Drawing Sheets

METAL STATIC SEAL AND ASSEMBLY COMPRISING SUCH A SEAL

The present invention relates to a metal static seal with elastic restitution, as well as to assemblies by screwed connection incorporating such a seal.

The invention concerns more particularly a metal static seal comprising an annular part forming a bead and first and second wings connected laterally to the bead and extending transversely with respect to the axis of the seal, the seal presenting, in axial half-section, the shape of a V lying on its side, the tapered surfaces of the branches of the V being slightly inclined with respect to the planar surfaces of the bead, perpendicular to the axis of the seal, to which they are attached.

Various types of static seals intended to ensure a seal in fixed assemblies are known. The static seals may thus for example be flat, toric, four-lobed, and may in particular be metallic, metalloplastic or of synthetic rubber.

The different static seals known comply with certain operational conditions but are not entirely satisfactory as regards the manufacturing costs, the mechanical qualities, nor the performances particularly from the standpoint of resistance to severe operational conditions.

The static seals of the elastomer type are relatively inexpensive, but have a relatively limited life duration.

The known metal static seals present better characteristics from the standpoint of performances of life duration, but are generally more expensive to manufacture.

It has already been proposed to produce metal static seals comprising wings attached to a bead and defining a V section. Such seals are for example described in French Pat. Nos. 1 356 218, 1 537 146 and 1 563 153. However, such seals have not been able to be used conveniently under difficult conditions of use, for example under high pressure or in the presence of considerable vibrations. This is due in particular to the fact that the different known seals of this type present only one zone of seal at the end of the lips, the bead presenting only a geometrical function of positioning of the seal and not being able to be compressed in significant manner. Moreover, the known seals of this type present concentrations of considerable stresses at the level of the grooves made between the bead and the branches of the V or on the bead itself, this rendering these seals unsuitable for use under severe conditions of operation where the mechanical forces are considerable.

The invention aims at overcoming the drawbacks set forth hereinabove and at producing a static seal which is both relatively inexpensive and presents excellent qualities from the standpoints of mechanical strength and resistance to aggressions under severe conditions of temperature, pressure, vibrations and chemical attack.

It is a further object of the invention to produce a static seal which is easy to manufacture and to instal within an assembly by screwed connection.

Yet another object of the invention is to produce a static seal presenting minimum dimensions and able to be associated with other types of conventional seals.

These objects are attained thanks to a metal static joint of the type defined in the beginning of the specification, characterized in that the annular part forming bead is semi-rigid, the first and second wings are connected laterally to the bead in gradual and regular manner forming concave surfaces with large radius of curvature, the branches of the V constituting the wings present an elasticity such that, by flexure of said tapered surfaces of the branches of the V, the ends of these surfaces may ensure with the planar surfaces of the slightly flexible semi-rigid bead, to which they are attached, two sealing regions.

The inclination of the tapered surfaces of the branches of the V with respect to the planar surfaces of the bead to which they are attached is advantageously of the order of 7° to 15° and preferably close to 10°.

According to a first embodiment in which the static seal presents an outer diameter less than or equal to about 14 mm, the bead constitutes an inner annular part and the branches of the V face outwardly.

According to another embodiment, in which the static seal presents an outer diameter greater than or equal to about 14 mm, the bead constitutes an outer annular part and the branches of the V face the axis of the seal.

The static seal is preferably made of metal or metal alloy presenting a unitary load with the limit of remanent elongation Re greater than or equal to about 60 h bar.

The invention also relates to an assembly by screwed connection, comprising an implantation piece provided with an inner thread, and a connecting piece composed of a connecting head and a threaded rod cooperating with said inner thread, assembly in which the connecting head presents a planar lower surface, the implantation piece comprises a countersink opposite said planar lower surface of the connecting head and a metal static seal with elastic restitution as defined hereinabove is interposed between said planar lower surface and said countersink.

According to a further feature, in such an assembly by screwed connection, cylindrical surfaces defining therebetween an annular housing intended to receive an O-ring made of elastomer are formed on the connecting piece and the implantation piece respectively in a region located between the connecting head and the threaded rod and in a region located between the countersink and the inner thread.

Other characteristics and advantages of the invention will appear from the following description of particular embodiments with reference to the accompanying drawings, in which.

Figure 1:
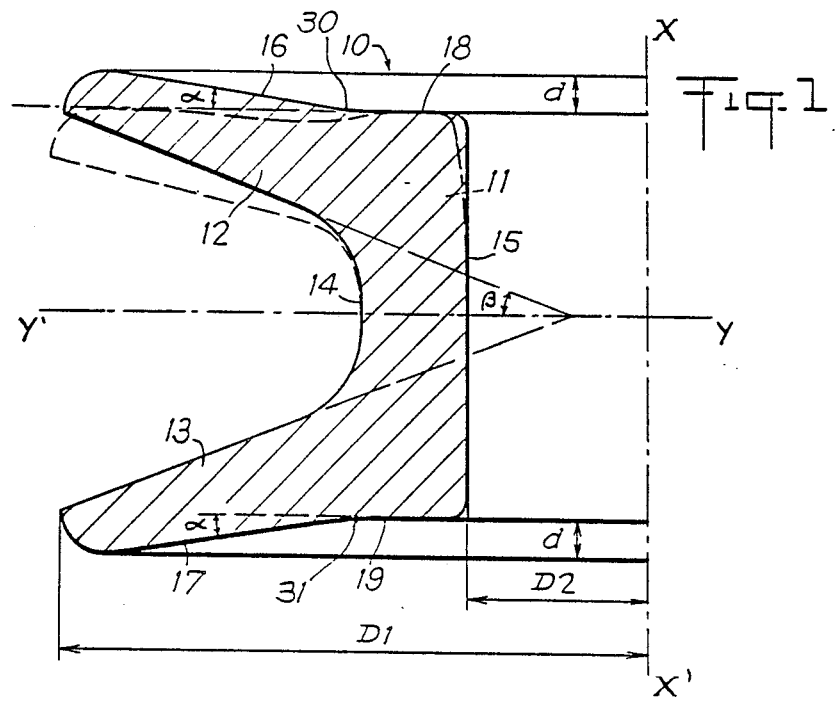
FIG. 1 is a view in axial half-section of a first embodiment of static seal according to the invention.

FIG. 1 shows a first embodiment of metal static seal 10 according to the invention, which presents a symmetry of revolution about its axis X—X' and comprises a semi-rigid annular part 11 defining a bore 15 of diameter D2 to which are connected first and second wings 12, 13 which extend outwardly with respect to the annular part 11. Seen in axial half-section, the metal seal 10 presents the form of a V lying on its side with a bead defined by the semi-rigid annular part 11 and wings or branches defined by the first and second wings 12, 13.

The outer tapered surfaces 16, 17 of the branches 12, 13 of the V are slightly inclined outwardly, by an angle α which may be of the order of 7 to 15°, and preferably close to 10°, with respect to the planar outer frontal surfaces 18, 19 of the bead 11 which are perpendicular to axis X'X of the seal 10. The branches 12, 13 of the V present a thickness which decreases regularly from their zone of connection to the bead 11 up to their free end, which is rounded. The inclination of the inner faces of the branches 12, 13 with respect to a plane of symmetry Y'Y perpendicular to the axis X'X of the seal may thus correspond to an angle β greater than angle α and close for example to 20°. The inner faces of the branches 12, 13 are connected to the bead 11 by a concave curved part 14 with relatively large radius defining a U of which the branches are divergent.

The outer surfaces 16, 17 of the branches 12, 13 of the V are themselves connected to the front surfaces 18, 19 of the bead 11 in gradual and regular manner, by concave surfaces 30, 31 with large radius of curvature. Consequently, the seal comprises no groove capable of allowing a concentration of stresses.

In rest position, each of the wings 12, 13 of the seal 10 forms a ring of which the outer edge projects at a distance d with respect to the level of the corresponding front face 18, 19 of the bead of the seal. When the seal 10 is in operation, the elastic wings 12, 13 and the semi-rigid bead 11 bend along a profile making it possible to ensure the sealing contacts on the one hand at the outer ends of the faces 16, 17 and on the other hand on the faces 18, 19 of the bead. The profile of the seal in operation is shown in broken lines in FIG. 1. The presence of two sealing regions thanks to the slight flexure of the bead 11 which is added to the flexure of the wings 12, 13 constitutes an essential feature of the present invention which increases the performances and guarantees operational safety of the seal even in the case of very high-level vibrations.

The seal 10 is entirely metallic, but different coatings, for example of PTFE or silver may be used to facilite assembly thereof under screwed connection without it being necessary to interpose washers. It is possible to choose all metals or alloys having good metallic characteristics, particularly with a unitary load with limit of remanent elongation Re greater than or equal to about 60 h bar. For uses under severe conditions of temperature or chemical conditions, a strongly alloyed steel may for example be used, such as Z6 NCT 25-15 or an alloy such as the one known under the name "Inconel" and essentially comprising 50% nickel, 10% chromium and 19% iron.

The configuration of the seal 10, which presents an inner bead 11 and wings 12, 13 define a V lying on its side of which the opening faces outwardly, is more particularly adapted to applications necessitating relatively restricted dimensions, and must preferably be chosen to make seals of which the diameter D1 is less than about 14 mm.

Figure 2:
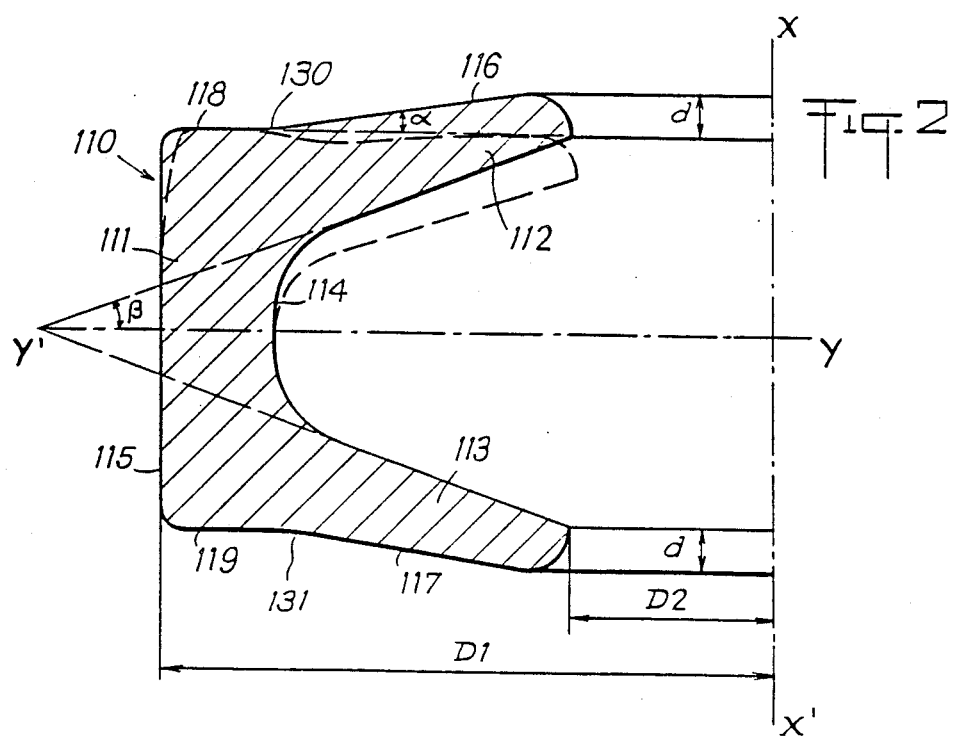
FIG. 2 is a view in axial half-section of a second embodiment of static seal according to the invention.

For seals 110 of which the diameter D1 must be greater than about 14 mm, the configuration of FIG. 2 is preferably adopted. The seal 110 of FIG. 2 presents a constitution similar to that of the seal 10 of FIG. 1, but the semi-rigid annular bead 111 is disposed outside and the flexible wings 112, 113 extend inwardly with respect to the semi-rigid annular bead 111. The semi-rigid annular bead 111 thus presents planar frontal faces 118, 119 perpendicular to the axis XX' of the seal and an outer cylindrical surface 115 having for axis axis X'X and defining the outer diameter D1 of the seal. The inner diameter D2 of the seal 110 is defined by the inner edges of the wings 112, 113.

As in the case of FIG. 1, the metal seal 110 presents, seen in axial half-section, the form of a V lying on its side, but the wings or branches defined by the first and second wings 112, 113 are directed towards axis X'X of the seal. The tapered outer surfaces 116, 117 of the branches 112, 113 of the V of FIG. 2 are slightly inclined outwardly by an angle α as in the case of FIG. 1, to be offset outwardly by a distance d with respect to the frontal faces 118, 119 of the semi-rigid bead 111 when the seal is in the state of rest. As for the case of the embodiment of FIG. 1, the outer surfaces 116, 117 of the branches 112, 113 are connected to the frontal surfaces 118, 119 of the bead by concave surfaces 130, 131 with large radius of curvature. The inclination and shape of the branches 112, 113 may be quite similar to those of branches 12, 13 of the seal 10 of FIG. 1 and the inner surfaces of the branches 112, 113 may thus be connected to the bead 111 by a concave curved part 114 with relatively large radius.

When the seal 110 is in operation, the elastic wings 112, 113 and the bead 111 bend along a profile making it possible to ensure the sealing contacts at outer ends of the faces 116, 117 and on the frontal faces 118, 119 of the semi-rigid outer ring 111. The profile of the seal in operation is shown in broken lines in FIG. 2.

Figure 3:
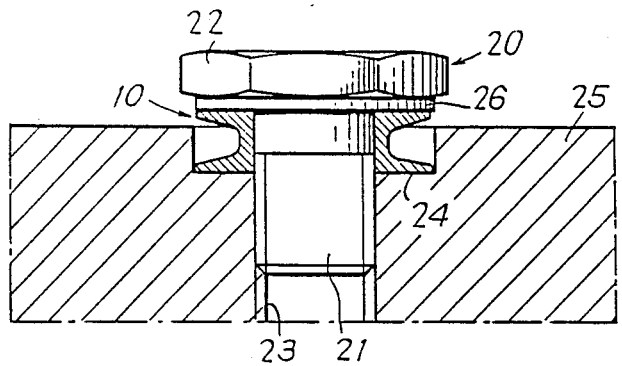
FIGS. 3 and 4 show a schematic view in axial section of an assembly by screwed connection incorporating static seals corresponding respectively to the embodiments of FIGS. 1 and 2.
Figure 4:
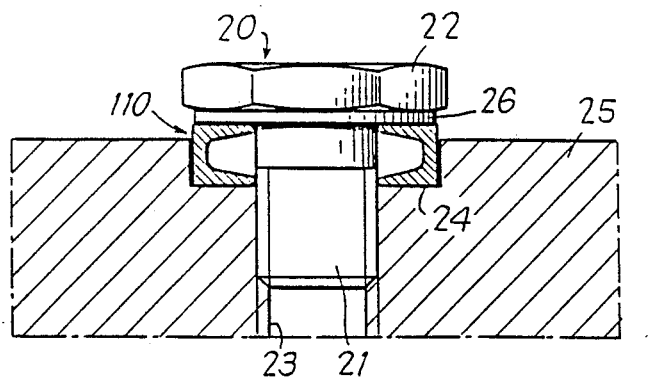

The seals 10, 110 according to the invention make possible assemblies under screwed connections (FIGS. 3 and 4). The seal 10, 110 may be mounted with or without countersink, only the surface state of the bearing surfaces in contact with the seal performing a role. The stiffness of the seal 10, 110 is such that, upon assembly, the wings of the seal may be sufficiently bent for the connection to come into contact with the bead of the seal which then ensures mechanical continuity between the connection and the body on which the connection is implanted.

FIGS. 3 and 4 concern two assemblies of seals under screwed connection, in which the connection 20 comprises a head 22 with a planar lower face 26 bearing on the seal 10 or 110, and a threaded cylindrical part 21 which cooperates with the thread 23 of an orifice formed in the body 25 in which is implanted the connection 20. Seal 10 or 110 is disposed on a countersink 24 made in the body 25. FIG. 3 shows the use of a seal 10 corresponding to the configuration of FIG. 1, whilst FIG. 4 shows the use of a seal 110 corresponding to the configuration of FIG. 2. It is seen that the mode of assembly under connection is quite similar for joints 10 and 110.

Figure 5:
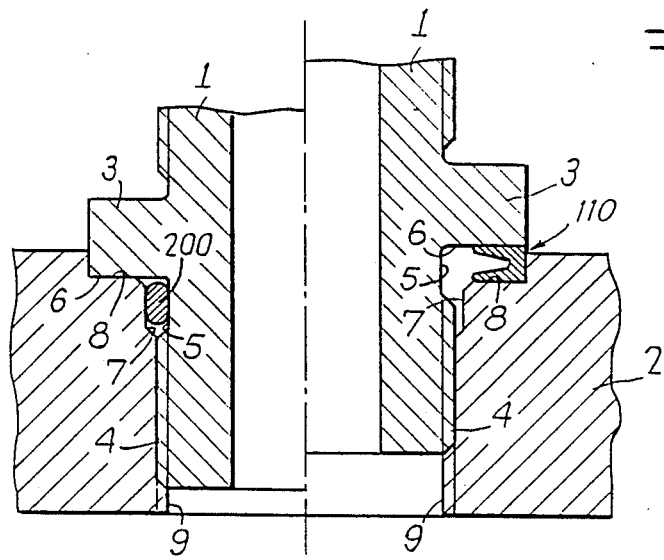
FIG. 5 is a view in axial section of an assembly by screwed connection, adapted to incorporate both a metal static seal according to the invention and an elastomeric O-ring.
Figure 6:
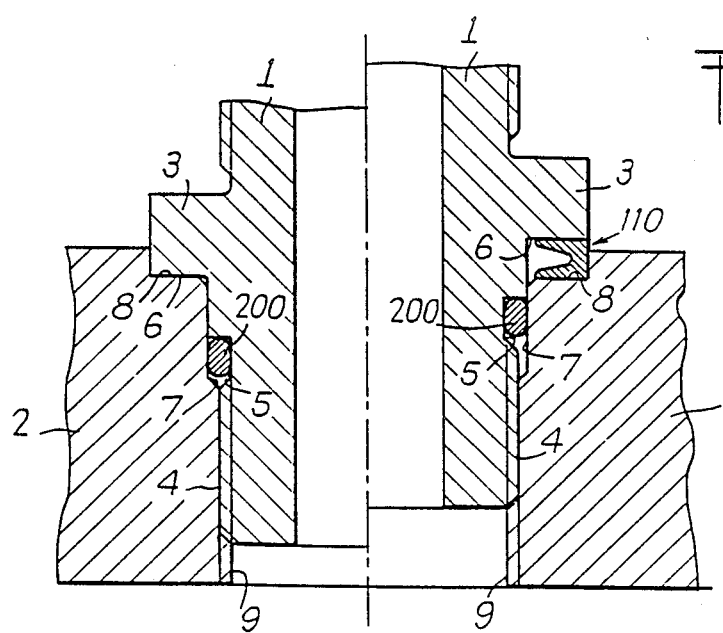
FIG. 6 is a view in axial section of an assembly by screwed connection, adapted to incorporate both a metal static seal according to the invention and an elastomeric O-ring.

FIGS. 5 and 6 each show an assembly by screwed connection allowing the positioning, for the same connection 1 and the same implantation piece 2, either of a conventional elastomeric O-ring 200, or of a metal seal 110 according to the invention presenting a section in the form of a V.

FIGS. 5 and 6 each show two half-views in axial section of the assembly, the left-hand half-view showing the use of an O-ring and the right-hand half-section showing the use of a metal seal with (type of FIG. 2) or without (type of FIG. 1) O-ring.

In each case, the connection 1 presents two surfaces making it possible to receive two types of seals:

a cylindrical surface 5 which allows an elastomeric O-ring 200 to be maintained, a planar surface 6 which is formed on a connecting head 3 perpendicularly to the axis of the connection and allows the metal seal 110 to be tightened.

In the case of the assembly of FIG. 5, it is possible to position either the elastomeric seal 200 or the metal seal 110 according to need.

In the case of the assembly of FIG. 6, it is possible to position the two seals 110, 200 simultaneously when the redundancy is necessary. This second type of assembly is a little more cumbersome, and requires greater length of connection 1 and depth of implantation (surface 7). It may, however, be considered as universal since it makes it possible to mount, as a function of need, either an elastomeric seal alone, or a metal seal alone, or a metal seal and an elastomeric seal at the same time, and that without changing anything either on the implantation or on the connection.

In FIGS. 5 and 6, references 4 and 9 designate the threads formed respectively on the connection 1 and on the implantation piece 2. The materials are a function of the needs, but the connection 1 is advantageously made of stainless steel.

The metal seal 10 or 110 according to the invention may thus be used with assemblies with connections which may be considered as universal.

The metal static seal 10 or 110 according to the invention may be used in very vast ranges of temperature, of vibrations and of pressure, which depend in fact on the material used and on the dimensioning of the seal. Taking into account its shape, i.e. in particular thanks to the presence of concave connecting surfaces with large radius of curvature between the wings and the bead, and to the absence of zones of concentration of stresses, such a seal may thus withstand high pressures, for example greater than 500 bars, is not likely to be damaged by temperatures capable of reaching for example −270° C. to +800° C., and may withstand very high level vibratory environments for example 40 g effective.

If the material used for the seal 10 or 110 is of the stainless steel type, the seal is in a position to withstand all the current chemical environments. It will be noted that it is well adapted to effect seals with fluids of high diffusivity, such as helium or hydrogen.

The seals 10, 110 may present a very small bulk in the axial and radial directions, the minimum dimensions being of the order of 2×2 mm. This allows assemblies of very reduced mass and bulk.

In addition, taking into account its very simple shape, the seal 10 or 110 according to the invention is adapted to be manufactured on a lathe with numerical control. This makes it possible to obtain a very competitive price which is not greater than that of an elastomeric seal of good quality and is situated well below the price of the known quality metal seals not presenting the specific shape proposed within the scope of the present invention.

We claim:

1. A generally round static seal made of a material selected from the group consisting of metal and metal alloys, presenting a unitary load with the limit of remanent elongation Re at least equal to about 60 h bar, coated with a thin layer of coating for the assembly of the seal without the interposition of a washer, having a longitudinal axis, and comprising an annular-part-forming slightly flexible semi-rigid bead and first and second wings connected laterally to the bead and extending transversely therefrom with respect to the axis of the seal, the seal presenting in axial half-section the form of a V lying on its side, the bead having two oppositely disposed planar lateral surfaces perpendicular to the axis of the seal, each wing having an outer tapered surface slightly inclined to its respective planar lateral surface of the bead and connected thereto in a gradual and regular manner to form a concave surface with a large radius of curvature, the wings and bead having an elasticity such that when the wings are flexed said bead flexes displacing said planar lateral surfaces, said wings outer tapered surfaces provide with the displaced planar lateral surfaces of the bead two sealing regions, the flexural capabilities of the wings being determined exclusively by the characteristics of the seal and remaining independent from outer connecting pieces cooperating with the seal.

2. The static seal of claim 1 in which the inclination of each outer tapered surface to its respective planar lateral surface to which it is attached is from 7 to 15 degrees.

3. The static seal of claim 1 in which the inclination of each outer tapered surface to its respective planar lateral surface to which it is attached is approximately 10 degrees.

4. The static seal of claim 1 having an outer diameter at most equal to about 14 millimeters in which the bead constitutes an inner annular part and the tapered wings point away from the axis of the seal.

5. The static seal of claim 1 having an outer diameter at least equal to about 14 millimeters in which the bead constitutes an outer annular part and the tapered wings point towards the axis of the seal.

6. The static seal of claim 1 in which it is made of a strongly alloyed steel.

7. The static seal of claim 6 in which the alloy is Z6 NCT 25–15.

8. The static seal of claim 6 in which the alloy comprises 50% nickel, 10% chromium, and 19% iron.

9. An assembly by screwed connection comprising an implantation piece provided with an inner thread, and a connecting piece composed of a connecting head and a threaded rod cooperating with the inner thread, in which the connecting head has a planar lower surface, the implantation piece has a countersink opposite the planar lower surface of the connecting head, and the static seal of claim 9 is interposed between the planar lower surface and the countersink.

10. An assembly by screwed connection in accordance with claim 9 having cylindrical surface defining therebetween an annular housing for receiving an O-ring made of elastomer, the cylindrical surfaces being formed on the connecting piece and the implantation piece respectively in a region located between the connecting head and the threaded rod and in a region located between the countersink and the inner thread.

* * * * *